United States Patent [19]
Cortijo

[11] Patent Number: 5,224,199
[45] Date of Patent: Jun. 29, 1993

[54] UNIVERSAL ACCESS OPTICAL FIBER JUNCTION BOX

[75] Inventor: Jesus D. Cortijo, Madrid, Spain

[73] Assignee: Telefonica de Espana, Madrid, Spain

[21] Appl. No.: 853,263

[22] Filed: Mar. 18, 1992

[30] Foreign Application Priority Data

Apr. 22, 1991 [ES] Spain .................................. 9102486

[51] Int. Cl.⁵ .......................... G02B 6/00; G02B 6/36
[52] U.S. Cl. .................................................. 385/135
[58] Field of Search ............... 385/134, 135, 136, 137

[56] References Cited

U.S. PATENT DOCUMENTS

| 4,332,435 | 6/1982 | Post | 385/135 |
| 4,502,754 | 3/1985 | Kawa | 385/135 X |
| 5,129,030 | 7/1992 | Petrunia | 385/135 |

*Primary Examiner*—Akm E. Ullah
*Attorney, Agent, or Firm*—Mason, Fenwick & Lawrence

[57] ABSTRACT

An universal access optical fiber junction box consisting of a box in which the access system to the cables is composed of a series of small external channels and open and independent rubber plugs allowing to handle the cables and optical fiber junctions with a minimal interruption of service, allowing, furthermore, to replace independently all the elements composing the box.

10 Claims, 4 Drawing Sheets

UNIVERSAL ACCESS OPTICAL FIBER JUNCTION BOX

OBJECT OF THE INVENTION

The present specification refers to a universal access optical fiber junction box, the purpose of which is to house individual junctions of optical fibers.

FIELD OF THE INVENTION

The application of this invention is within the telecommunications field and, particularly, to be used in substructures of external plants necessary for constituting an optical fiber network.

PRIOR ART

At present, different optical fiber junction boxes and assemblies are known, all them designed and destined to house junctions.

Nevertheless, in all boxes and assemblies hitherto known, it is not possible to replace individual fibers of the damaged cables, it being necessary to cut the connection to all of the fiber junctions of said cables.

The solution to this problem would be to dispose of a box for optical fiber junctions, allowing to replace the damaged cables so that it would be not necessary to cut the connections of all fiber junctions of the cable in question, so making easy the functional character and powering the operation of the own boxes, without the need of interrupting the service of all of the fibers at the same time.

It would be very convenient to dispose, also, of an optical fiber junction box incorporating inserts for connection rules for metal couple cables, to be later used as order couples or other functions.

Nevertheless, until now, no optical fiber junction box is known having the qualities above specified as suitable.

DESCRIPTION OF THE INVENTION

The universal access optical fiber junction box proposed herein provides a solution that, obviously, simplifies the problems existing at present for this type of objects, and it is fitted, at the same time, of all the characteristics considered as suitable.

In a more definite manner, the universal access optical fiber junction box proposed by this patent of invention is composed of three essential parts.

That is to say:
A base.
A cover
A frame with tray.

The base is parallelepiped and has a flange housing an O-ring and a series of threaded inserts, which are uniformly distributed between the O-ring housing and the edge of the flange which incorporates screws to appropriately close the box.

At the bottom of the base, there are arranged different inserts the function of which is to fasten the frame, the flanges and anchoring fasteners.

On one of the minor faces of the base, there are inserted channels which allow the cables to enter where the cable plugs are located, and small iron plates with a throat fastening them.

Also, the base of the box has a few inserts allowing to fasten the connection rules of metal couple cables or similar.

At the bottom of the base, placed on the outside thereof, there are arranged four exactly similar wings on which are arranged rubber joints allowing to solve possible irregularities of the surfaces on which the box installation is to be made, accounting for the pertinent transfers allowing to fasten the box by using conventional screws to carry out the fastening.

The configuration of the cover is trapezoidal, having a flange on its edge which allows the O-ring housing. In addition, it has reinforcements on the side faces of its external front end, these reinforcements permitting, therefore, a tight closing of the box upon pressing on the sealing system.

Also, at the front end, there are small iron plates with a throat, which jointly with those placed on the base, the cables remain perfectly fastened.

Besides, on the flange itself, there are arranged a series of safety screws uniformly distributed and coincidental with the base inserts, so allowing a tight closing jointly with the O-ring.

The cover is fitted with a vertical embossing or drawing to make easy the entry or exit of possible water deposits, either from rain or from condensation.

The frame is fixxed to the base by means of screws, and it is composed of two parts, That is to say:
A support with trays.
The trays.

The tray support is fastened to the base by screws, as above mentioned, and it is composed of two symmetrical elements on which the trays are arranged, and these trays can be dropped from the horizontal position (0°) to the vertical one (90°).

An arranger is located on the tray which allows to position the junction and a disk, to make easy to store the optical fiber without exceeding the minimal curvature degree thereof, and so not to introduce additional losses into the installation.

The trays have a series of drill holes allowing to fasten the fibers, having as a second protection a series of plastic bands.

For a greater safety, the tray assembly incorporates an additional fastening of Belcron.

The universal access system comprises open and independent plugs for each cable, which are arranged on the cable, and rest in the channels located at the base of the box, so allowing a fully watertight closing.

The plugs are open and independent for each cable, and they are located in each channel of access for the base cables.

Their design allow to act with an absolute independence at each cable, as well to eliminate the access throu the end of same, since their open plug feature allows to be positioned on a side, which, in turn, simplifies and remarkably reduces the cutting time of the service carried by the fibers forming the cable, as it is not already necessary to simultaneously interrumpt all them.

Furthermore, these plugs allow several simultaneous and independent inlets for different diameters of cables.

Also, there are several areas to house spare plugs.

The number of access channels can be variable, although the usual number is three or four.

The whole design of the universal access box allows to replace all and every elements constituting the junction box, without the need of interrumping the service transmitted by the fibers forming the cable.

DESCRIPTION OF THE DRAWINGS

To complement the present description and in order to aid to a better understanding of the features of this invention, the attached drawings show, in an illustrative and non-limitative manner, the following.

PREFERRED EMBODIMENT OF THE INVENTION

Figures 1, 2:
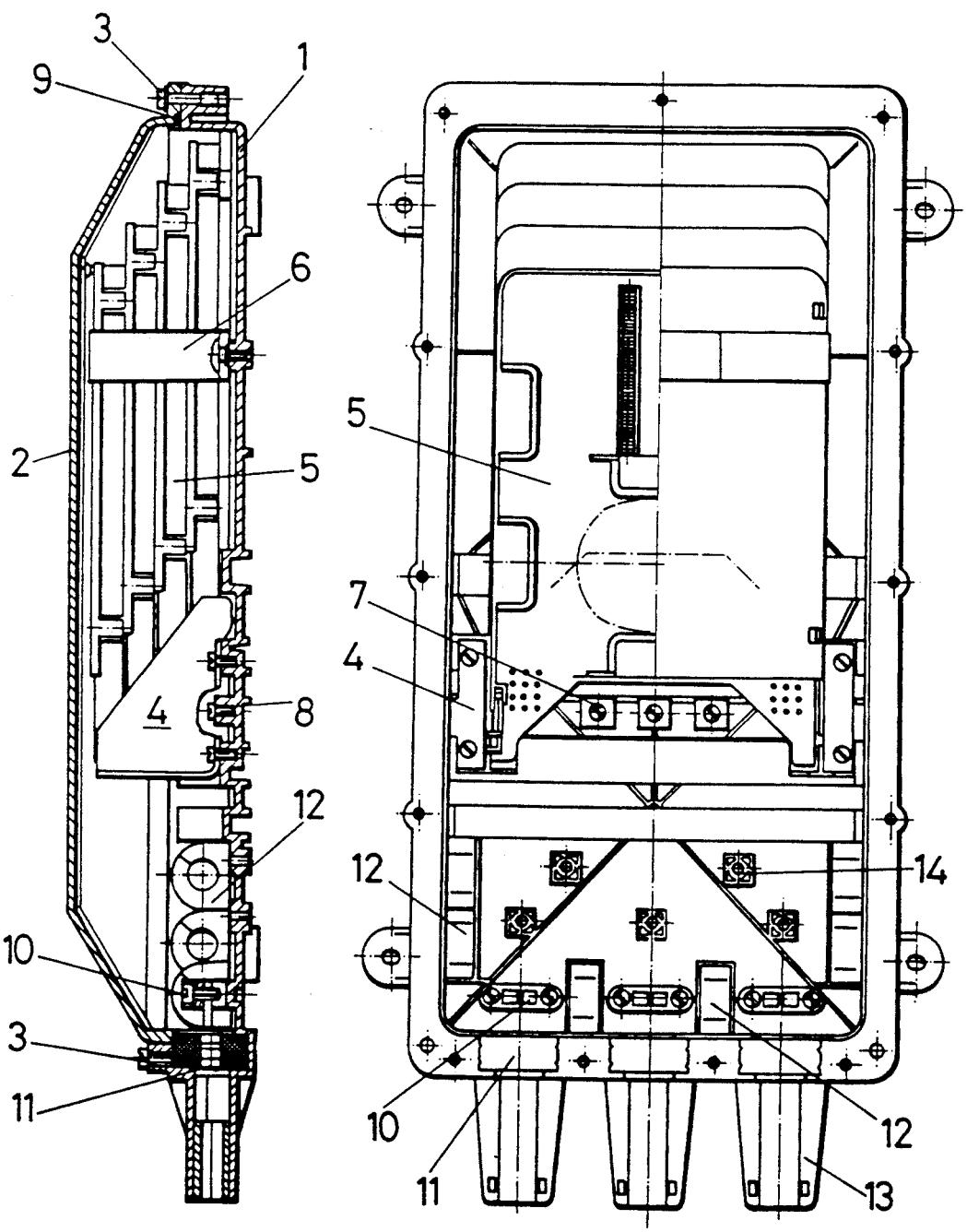
FIG. 1 shows a longitudinal cross-sectional view of the universal access optical fiber junction box of the present invention.
FIG. 2 shows a plan view of the object shown on FIG. 1.
Figures 3, 4:
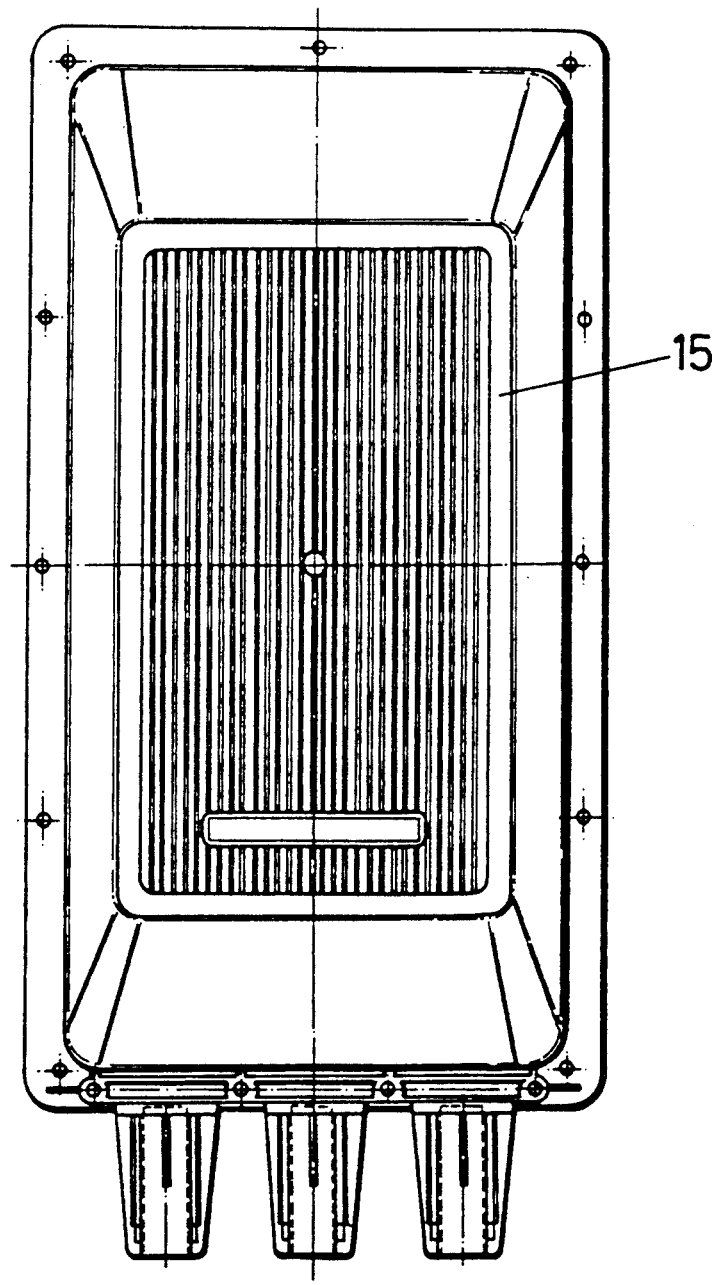
FIG. 3 shows an outer elevational view of the junction box cover.
FIG. 4 shows an outer plan view of the object shown on FIG. 3.

From these Figures, it can be seen that the universal access optical fiber junction box as proposed by this invention is constituted starting from a base (1), incorporating the outwardly extending cable inlet channels (13).

As it can be seen, by using screws (3), the cover (2) closes the base (1), enclosing the trays (5), which are piled up on a tray support (4), and by means of a supplementary fastening aid (6), which can be constituted as a Belcron rubber.

Likewise, the tray support (4) is fixed by means of screws (8) located on the base.

The fasteners (7) shape the anchoring of the reinforcement of the cables.

On the same base, there are located inserts (14) to fasten metal couple cable connecting rules or similar.

The trapezoidal cover has a flange on its edge to house the O-ring (9) and a series of side reinforcements (15) destined to give a greater resistance to the embossing zone of the cable access channels.

The cover has, also, a vertical prominence (16) forming a multichannel, the function of which is to expedite the escape of the water possibly settled on it, either due to rain or condensation.

The universal access system comprises outwardly extending channels (13) on which the cables rest.

Plugs (11) have the characteristic that they are provided with an opening, which allows them to be positioned on the cable through a slit in the side, thereby eliminating the need of being placed over the end of a cable, while closing tightly and independently the access at each cable, and the cables remaining fixed by means of the flanges (10).

Likewise, the box has recesses (12) to receive spare plugs.

Figure 5:
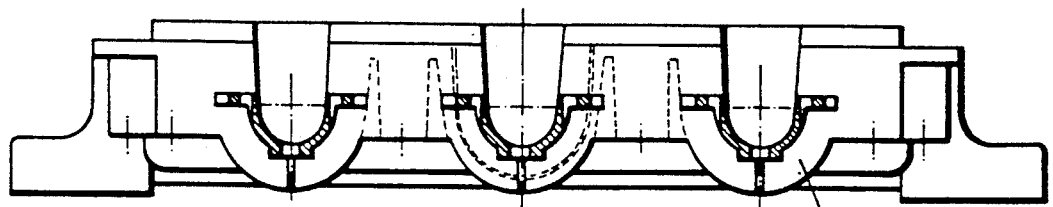
FIG. 5 shows an elevational view of the access system of cables to junction box.
Figure 6:
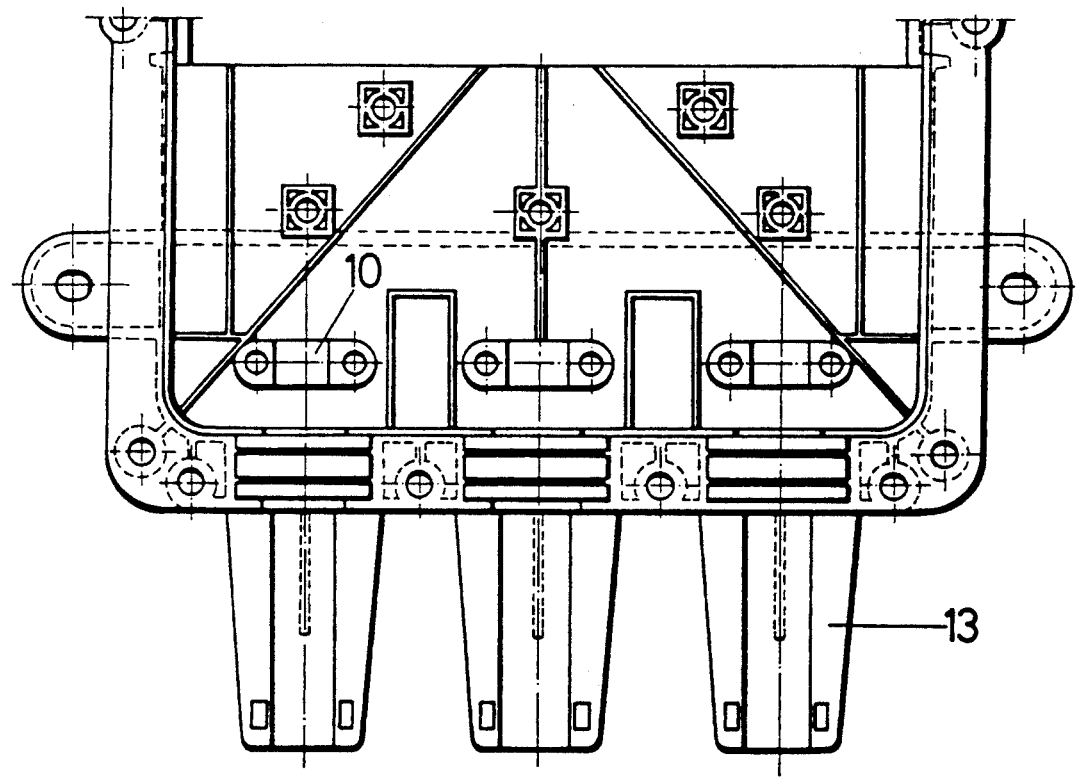
FIG. 6 shows a plan view of the object shown on FIG. 5.
Figure 7:
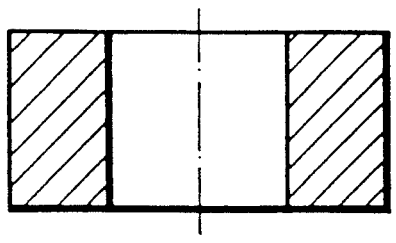
FIG. 7 shows an elevational view of the plug used in the universal access system of the junction box.
Figure 8:
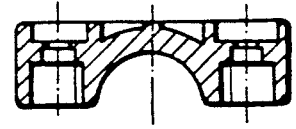
FIG. 8 shows an elevational view of the cable flange used in the universal access system of the junction box.
Figure 9:
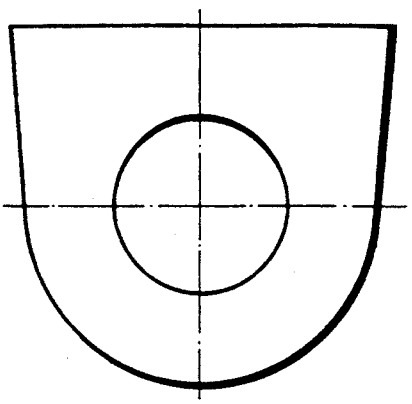
FIG. 9 shows a plan view of the object shown on FIG. 7, showing the cutting zone.
Figure 10:
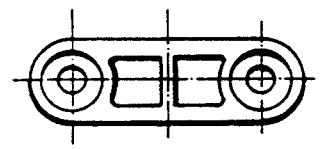
FIG. 10 shows a plan view of the object shown on FIG. 8.
Figure 11:
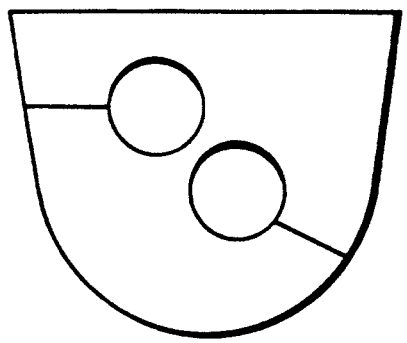
FIGS. 11, 12 and 13 show, lastly, plugs fitted with different inlet orifices for the cables.
Figure 12:
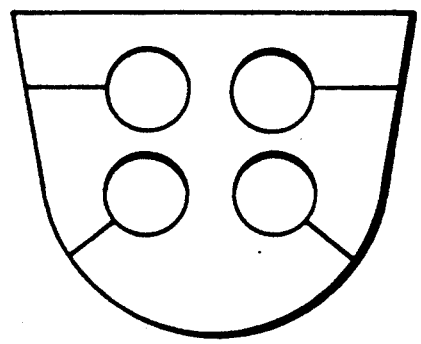
Figure 13:
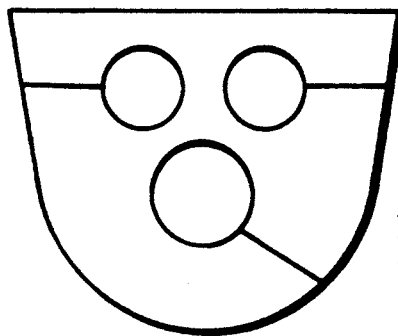

As above-mentioned, FIGS. 5 and 6 show the assembly of the elements composing more in detail the access system, these elements being independently shown on FIGS. 7 and 9, which show a plug for a cable, whilst FIGS. 8 and 10 show the cable flange, as well as several types of plugs shown on FIGS. 11, 12 and 13, which show, respectively, plugs for two cables, three cables or four cables.

It is considered not necessary to make more extensive this description for any expert in the art to understand the scope of the invention and the advantages derived from it.

The materials, size, shape and arrangement of the elements will be open to variation provided that it does not imply any alteration to the essence of the invention.

The terms under which this specification has been described should be taken in an ample and not limitative sense.

I claim:

1. A junction box for providing access to optical fibers for making splices therein comprising:
   a base and a cover defining an enclosure therewithin,
   each of said base and said cover having a plurality of elements providing half-cylindrical channels, the elements at the base being in facing relationship to the elements of the cover to provide a plurality of generally cylindrical passages for supporting optical fiber cables,
   pairs of recesses adjoining said elements in said cover and said base, and
   a plug of resilient material in each of said pairs of recesses, said plugs each having at least one opening therein for engagingly receiving an optical fiber cable passing in a said adjoining passage in a facing pair of said elements.

2. The junction box of claim 1, and means extending about the periphery of said base and cover for preventing the entry of liquid therebetween into said junction box.

3. The junction box of claim 1, at least one of said base and cover providing at least one recess therein for holding spare plugs.

4. The junction box of claim 1, said cover having reinforcing structure adjacent the said plugs.

5. The junction box of claim 1, and further comprising inserts adjacent to said elements and located on the base for fixing cable connecting strips.

6. The junction box of claim 1, wherein said base is relatively shallow, and said cover is relatively deep, said cover having sloped side and end walls and a rectangular top.

7. The junction box of claim 6, and further comprising an inner frame having therein a plurality of optical fiber junction trays.

8. The junction box of claim 1, wherein at least one said plug has a plurality of openings extending therethrough for receiving a separate cable of optical fibers in each said opening.

9. The junction box of claim 8, and wherein there is provided a slit in said plug for each of said openings, each said slit extending from the exterior of said plug to a said opening.

10. The junction box of claim 1, and a slit extending from the exterior of said plug to said opening.

* * * * *